(12) United States Patent
Schäferlein

(10) Patent No.: US 7,824,128 B2
(45) Date of Patent: Nov. 2, 2010

(54) GRAVITY-FED BASIN FOR DISCHARGING INDUSTRIAL WATER INTO A RECEIVING BODY OF WATER

(75) Inventor: Hubert Schäferlein, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 11/884,696

(22) PCT Filed: Feb. 15, 2006

(86) PCT No.: PCT/EP2006/050969

§ 371 (c)(1),
(2), (4) Date: Apr. 8, 2008

(87) PCT Pub. No.: WO2006/087349

PCT Pub. Date: Aug. 24, 2006

(65) Prior Publication Data

US 2008/0190828 A1    Aug. 14, 2008

(30) Foreign Application Priority Data

Feb. 21, 2005  (EP) ................... 05003663

(51) Int. Cl.
*E02B 7/00* (2006.01)
*E03F 1/00* (2006.01)

(52) U.S. Cl. ........................................ 405/80; 405/127

(58) Field of Classification Search ............... 210/116; 137/247; 405/52, 80, 87, 88, 89, 127
See application file for complete search history.

(56) References Cited

U.S. PATENT DOCUMENTS

2004/0251566 A1* 12/2004 Kozyuk ....................... 261/76

FOREIGN PATENT DOCUMENTS

| DE | 31 03 306 A1 | 8/1982 |
| GB | 206804 | 4/1924 |
| JP | 07090828 A | 4/1995 |
| JP | 07191187 A | 7/1995 |
| JP | 2001003345 A | 1/2001 |
| JP | 2003268749 A | 9/2003 |

\* cited by examiner

*Primary Examiner*—John Rivell

(57) ABSTRACT

The invention relates to a gravity-fed basin for discharging industrial water into a receiving body of water. The gravity-fed basin comprises a gravity cylinder having an inlet opening and an outlet opening, and comprises an overflow sill formed by the edge of the inlet opening of the gravity cylinder. The invention is characterized in that the outlet opening of the gravity cylinder is located underneath the liquid level of the receiving body of water.

9 Claims, 3 Drawing Sheets

GRAVITY-FED BASIN FOR DISCHARGING INDUSTRIAL WATER INTO A RECEIVING BODY OF WATER

CROSS REFERENCE TO RELATED APPLICATIONS

This application is the US National Stage of International Application No. PCT/EP2006/050969, filed Feb. 15, 2006 and claims the benefit thereof. The International Application claims the benefits of European application No. 05003663.1 filed Feb. 21, 2005, both of the applications are incorporated by reference herein in their entirety.

FIELD OF INVENTION

This invention relates to a gravity-fed basin for discharging industrial water, especially the cooling water of a power station, into a receiving body of water.

BACKGROUND OF THE INVENTION

In power stations cooled by fresh water, the industrial water is discharged via a gravity-fed basin into a receiving body of water for operating reasons. A receiving body of water is stationery or flowing water into which the industrial water is discharged. The gravity-fed basin consists mainly of a water basin with a sill over which the industrial water is discharged into the receiving body of water. The industrial water is discharged into the receiving body of water only when the water level exceeds the height of the sill. The sill can be designed either as a linear sill or, for example, be formed by the top edge of a gravity cylinder extending upwards from the bottom of the water basin, such as is, for example, described in DE 31 03 306. The gravity cylinder described in DE 31 03 306 also has means for increasing the air input into the industrial water.

Depending on the type of power station, the throughput of industrial water through the gravity-fed basin is approximately 5 to 10 m³ per second depending on the permitted heating span of the industrial water. Depending on fluctuations in the water level of the receiving body of water, the industrial water flowing over the sill drops a few meters into the depth in order to mix with the water of the receiving body of water. Even if no measures are taken to introduce air into the industrial water, a high air input takes place as the water drops into the depth, which leads to more or less severe foaming depending on the water quality. This air input or foaming is usually unwanted either by the authorities or by adjoining owners.

Therefore, measures are usually tried and tested during the commissioning of a gravity-fed basin to reduce the air input or foaming. Such measures can sometimes be temporary covers that include the injection of chemicals, or ventilating or pipe systems. The latter in particular can lead to enormous additional costs.

Furthermore, the gravity-fed basin sometimes requires a relatively large building area.

SUMMARY OF INVENTION

The object of this invention is therefore to provide a gravity-fed basin that has advantages compared to prior art.

This object is achieved by a gravity-fed basin for the discharge of industrial water into a receiving body of water in accordance with the claims. The dependent claims contain advantageous embodiments of the inventive gravity-fed basin.

The inventive gravity-fed basin for the discharge of industrial water into a receiving body of water includes a gravity cylinder with an inlet opening and an outlet opening, with the edge of the inlet opening of the gravity cylinder forming an overflow sill. In the inventive gravity-fed basin, the outlet opening of the gravity cylinder is below the liquid level of the receiving body of water. The gravity-fed basin can especially be designed as a gravity-fed basin for the discharge of cooling water of a power station system.

Compared to gravity-fed basins with a linear sill, the inventive gravity-fed basin requires distinctly less building area. The amount of area utilized for building compared to the gravity-fed basin with a linear sill is reduced by approximately 35%. Furthermore, a reduction in the air input can be achieved in a gravity-fed basin of this kind.

In an advantageous embodiment of the inventive gravity-fed basin, at least one flow resistor is arranged inside the gravity cylinder. In this case, a baffle especially can be used as a flow resistor. The presence of the flow resistor in the gravity cylinder helps to reduce the air input during the discharge of the industrial water and thus also the foaming. Good results can be achieved if at least one first flow resistor, and a second flow resistor arranged downstream in the direction of flow of the industrial water, are present. Both flow resistors can be designed as baffles.

Particularly good results can be achieved if the flow resistors are designed as baffles with the cross-section of the opening of the second baffle, i.e. the baffle downstream in the direction of flow, being twice the size as the cross-section of the opening of the first baffle.

A further possibility of counteracting an air input and thus foaming is to arrange an anti-spin element, especially a spin cross, in the area of the inlet opening of the gravity cylinder. This is particularly so if at least one flow resistor is additionally present in the gravity cylinder. The object of the anti-spin element is to counteract the spin of the water flowing into the gravity cylinder. Spinning usually causes swirling in the flowing water, which leads to increased air input. Reduction in spin, for example by means of a spin cross, can reduce swirling and thus the air input into the outflowing water.

BRIEF DESCRIPTION OF THE DRAWINGS

Further features, properties and advantages of the invention are given in the following description of an example of an embodiment, with reference to the accompanying illustrations.

DETAILED DESCRIPTION OF INVENTION

Figure 1:
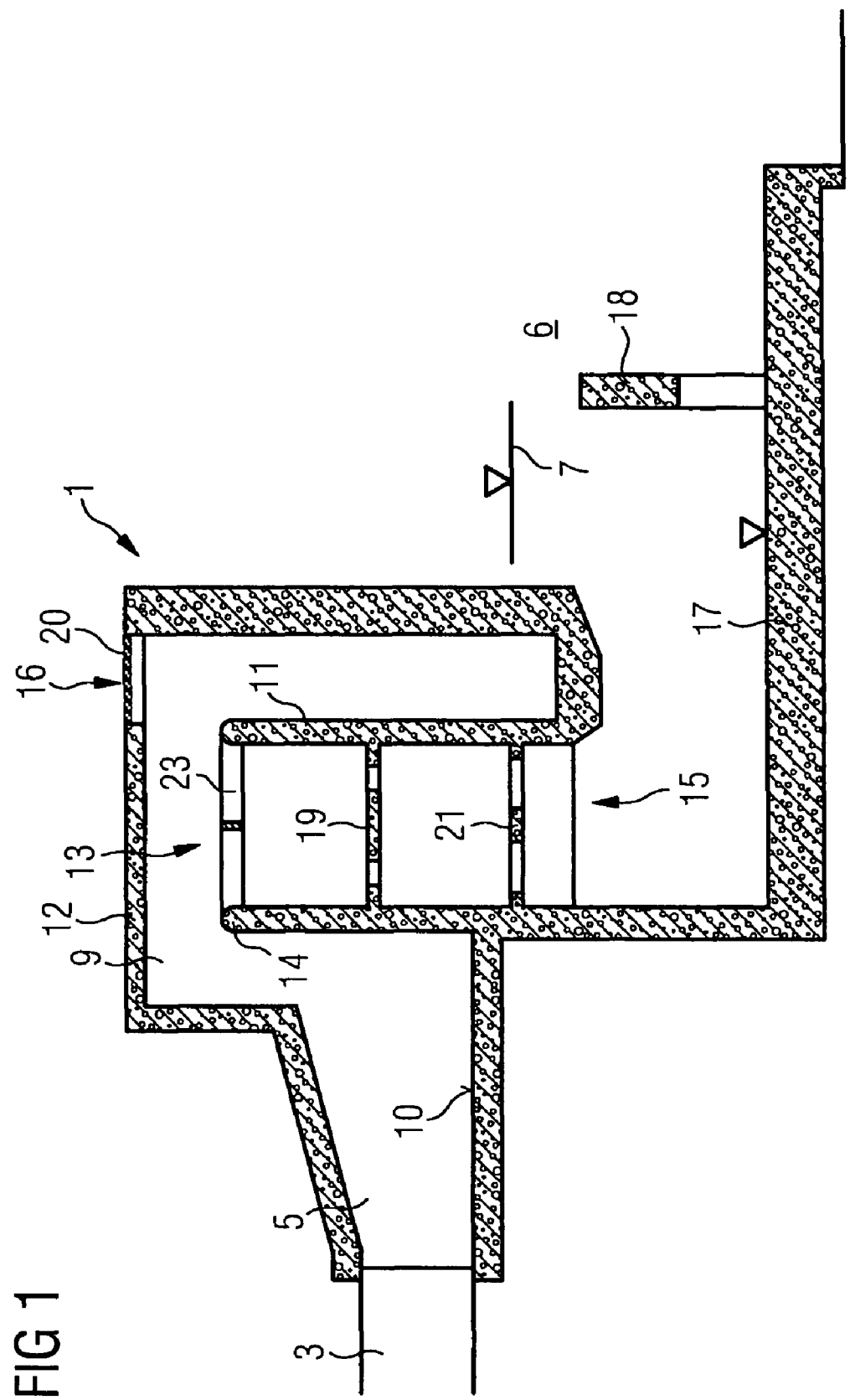
FIG. 1 shows a cutaway side view of an inventive gravity-fed basin.
Figure 2:
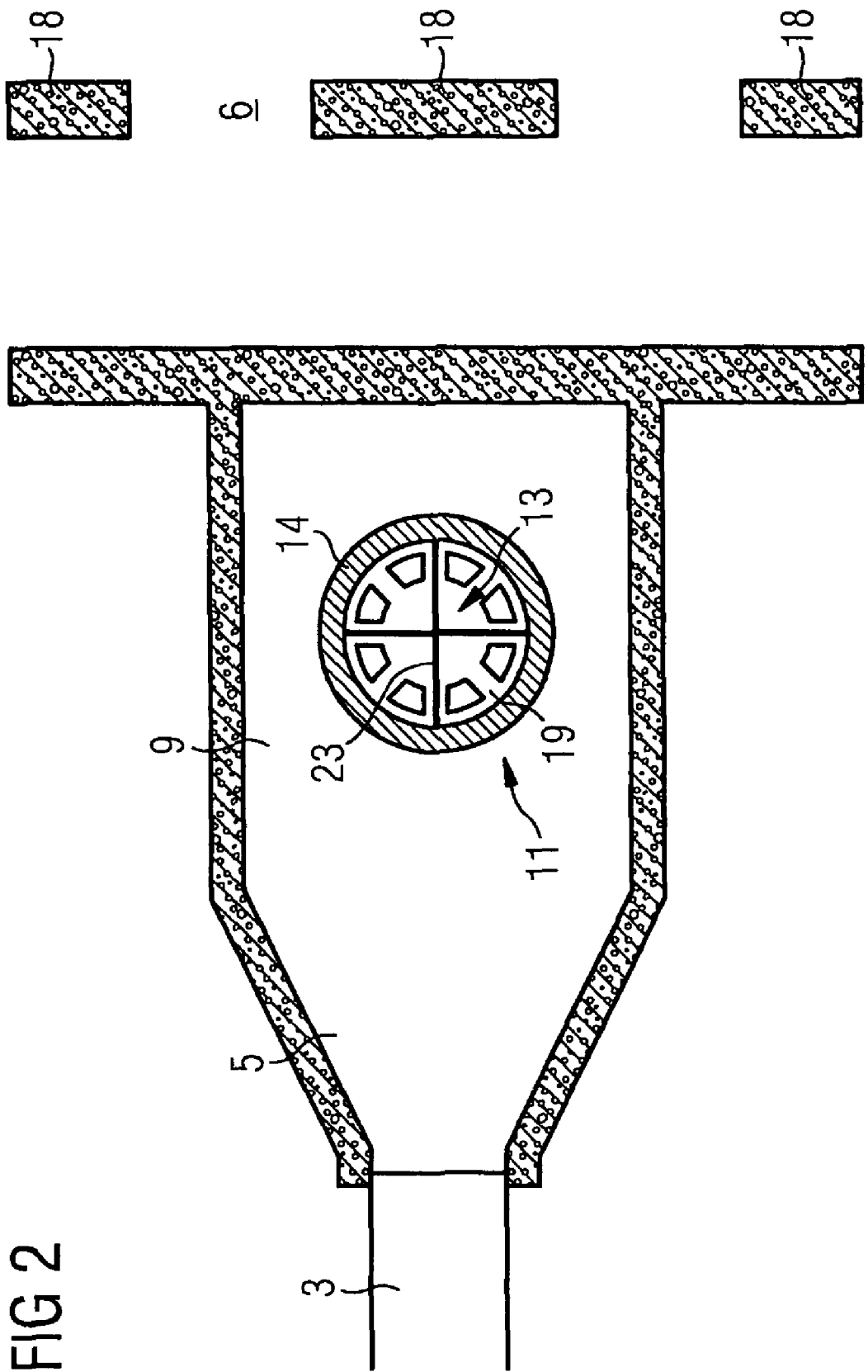
FIG. 2 shows a plan view of the cutaway gravity-fed basin in FIG. 1.

A gravity-fed basin 1 according to the invention is shown in FIGS. 1 and 2. FIG. 1 shows a vertical section of the gravity-fed basin 1, whereas FIG. 2 shows a plan view of a horizontal section of the gravity-fed basin 1.

The gravity-fed basin 1 is connected to a supply pipe 3 through which industrial water, for example cooling water from a power station, flows into the gravity-fed basin 1. The flow from the gravity-fed basin 1 is also in contact with a receiving body of water, the water level of which is indicated by line 7, and into which the industrial water is discharged.

The gravity-fed basin 1 includes an expansion chamber 5, a water basin 9 that is covered by a cover plate 12, and a gravity cylinder 11 the inlet opening 13 of which is arranged at a distance above the bottom 10 of the water basin 9. The outlet opening 15 of the gravity cylinder 11 is located below the water level line 7 of the receiving body of water. A base slab 17, from which several deflectors 18 project upwards, is arranged at a distance from the outlet opening 15. The outlet speed of the industrial water in the receiving body behind the deflectors 18 is less than 0.3 m/s.

To enable entry for inspection, an entry opening 16 is provided in the cover plate 12. The entry opening 16 is sealed by a cover grill 20 that does not restrict ventilation of the water basin 9 and thus counteracts the creation of a negative pressure in the water basin 9.

The top edge of the gravity cylinder 11, i.e. the boundary of the inlet opening 13, forms an overflow sill 14 for the industrial water in the water basin 9. The industrial water flows over this overflow sill 14 into the gravity cylinder 11. Inside the gravity cylinder 11 are two baffles 19 and 21 that serve as flow resistors for the industrial water flowing through the gravity cylinder 11. The baffles 19, 21 are arranged at different heights, with the lower baffle 21, i.e. the baffle arranged downstream in the direction of flow of the industrial water, having a cross-section of the opening that is larger than that of baffle 19. The cross-section of the opening of the baffle 19 is approximately half the size of the cross-section of the opening of the baffle 21.

A spin cross 23 is also arranged in the inlet opening, which is designed to prevent swirling of the industrial water flowing through the gravity cylinder 11.

Both baffles 19 and 21 form flow resistors that lead to back water, thus reducing the speed of flow of the industrial water in the gravity cylinder 11 so that "characteristic separation speed" is reached or undershot. When the speed of the flow is less than or equal to the characteristic separation speed, the air bubbles and water can segregate so that the air bubbles in the gravity cylinder 11 rise and can reach the surface of the water. Therefore the air content of the industrial water in the area of the outlet opening 15 is reduced compared to a gravity cylinder without baffles.

Figure 3:
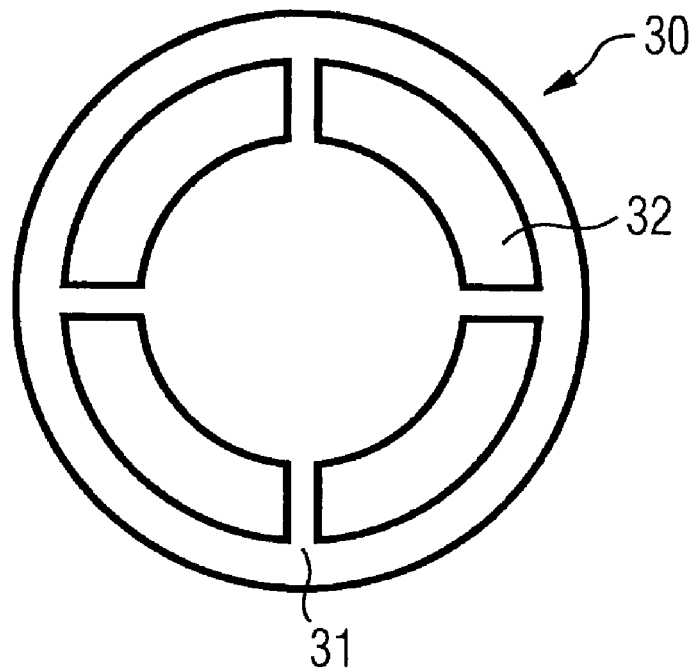
FIG. 3 shows a first example of an embodiment of a baffle to be fitted in the gravity cylinder.
Figure 4:
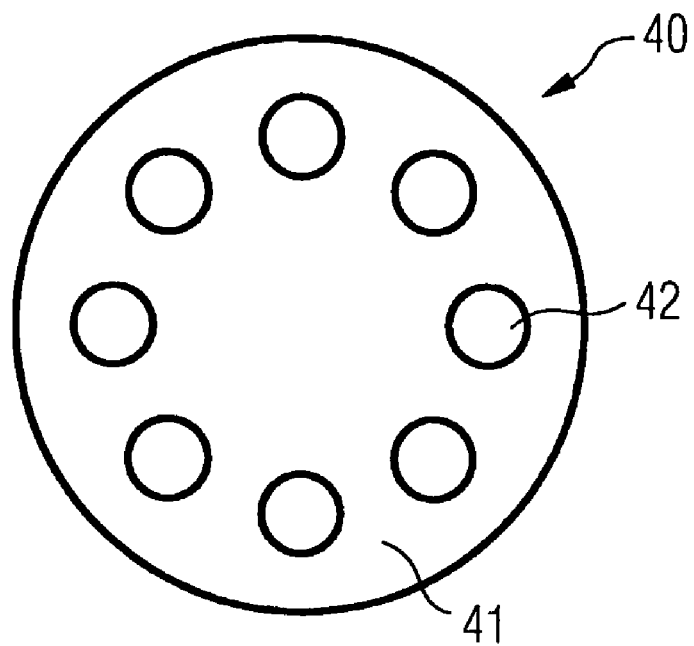
FIG. 4 shows a second example of an embodiment of a baffle to be fitted in the gravity cylinder.

Possible forms of baffles are shown in FIGS. 3 and 4. FIG. 3 shows a baffle 30 that, for example, is manufactured from a round metal disk as a baffle body 31. In its outer circumferential area the baffle body 31 has four slot-shaped baffle openings 32 evenly distributed around the circumference of the baffle body 31.

In the second variant of a baffle 40, shown in FIG. 4, the baffle body 41 has circular baffle openings 42 instead of slot-shaped baffle openings, with the baffle openings 42 being evenly distributed around the circumference of the baffle body 41.

Further types of baffle openings are conceivable. The air input into the industrial water falling through the gravity cylinder can be minimized by choosing suitable dimensions and shapes for the baffle openings. The shapes and dimensions of the baffle openings can be optimized by trial and error.

The invention claimed is:

1. A device for discharging industrial water into a receiving body of water, comprising:
   a gravity cylinder having an inlet opening and an outlet opening;
   a flow resistor arranged inside the gravity cylinder to reduce an input of air and a foaming of the industrial water within the gravity cylinder;
   an overflow sill formed by the edge of the inlet opening of the gravity cylinder, wherein the outlet opening of the gravity cylinder is located below the liquid level of the receiving body of water and the flow resistor is designed as a baffle; and
   a cover plate having an entry opening to enable entry for inspection of the gravity cylinder, wherein the entry opening is sealed by a cover grill which does not restrict ventilation into the device.

2. The device as claimed in claim 1, wherein a first flow resistor and a second flow resistor are arranged downstream with respect to a direction of flow of the industrial water, are present inside the gravity cylinder, the resistors being a first and second baffle, with the second baffle arranged downstream in the direction of flow, said second baffle having a larger cross-sectional opening than the first baffle.

3. The device as claimed in claim 2, wherein the cross-sectional opening of the second baffle is slot-shaped, and wherein the cross-sectional opening of the first baffle is circular.

4. The device as claimed in claim 3, wherein the cross-sectional opening of the second baffle is twice as great as the cross-sectional opening of the first baffle.

5. The device as claimed in claim 4, wherein an anti-spin element is arranged in an area of the inlet opening of the gravity cylinder to counteract an input of air and a foaming of the industrial water in the gravity cylinder.

6. The device as claimed in claim 5, wherein the anti-spin element is a spin cross.

7. A gravity fed basin, comprising:
   a gravity cylinder having an inlet opening and an outlet opening;
   a first flow resistor arranged inside the gravity cylinder to reduce an input of air and a foaming of the industrial water within the gravity cylinder;
   a second flow resistor arranged inside the gravity cylinder and downstream of the first flow resistor with respect to a direction of flow of the industrial water and having a larger opening cross-section than the first flow resistor, said second flow resistor to reduce the input of air and the foaming of the industrial water within the gravity cylinder;
   an anti-spin element arranged in an area of the inlet opening of the gravity cylinder to counteract the input of air and the foaming of the industrial water in the gravity cylinder;
   an overflow sill formed by the edge of the inlet opening of the gravity cylinder, wherein the outlet opening of the gravity cylinder is located below the liquid level of the receiving body of water.

8. The device as claimed in claim 7, wherein a cross-sectional opening of the second flow resistor is greater than the cross-sectional opening of the first flow resistor.

9. The device as claimed in claim 8, wherein the cross-sectional opening of the second flow resistor is twice as great as the cross-sectional opening of the first flow resistor.

* * * * *